(12) United States Patent
Hu et al.

(10) Patent No.: US 9,025,109 B2
(45) Date of Patent: May 5, 2015

(54) LIGHT GUIDING SYSTEM, EDGE-TYPE BACKLIGHT MODULE, AND LIQUID DISPLAY DEVICE

(71) Applicant: Shenzhen China Star Optoelectronics Technology Co., Ltd., Shenzhen, Guangdong (CN)

(72) Inventors: Che-chang Hu, Shenzhen (CN); Hu He, Shenzhen (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 199 days.

(21) Appl. No.: 13/818,796

(22) PCT Filed: Jan. 21, 2013

(86) PCT No.: PCT/CN2013/070802
§ 371 (c)(1),
(2) Date: Feb. 25, 2013

(87) PCT Pub. No.: WO2014/110836
PCT Pub. Date: Jul. 24, 2014

(65) Prior Publication Data
US 2014/0198281 A1  Jul. 17, 2014

(30) Foreign Application Priority Data
Jan. 15, 2013 (CN) .......................... 2013 1 0014410

(51) Int. Cl.
*G02F 1/133* (2006.01)
*F21V 8/00* (2006.01)
*G02F 1/1335* (2006.01)

(52) U.S. Cl.
CPC ............ *G02B 6/0028* (2013.01); *G02B 6/0068* (2013.01); *G02F 1/133615* (2013.01)

(58) Field of Classification Search
CPC ....................... G02F 1/133615; G02B 6/0068
USPC ............................................................ 349/65
See application file for complete search history.

(56) References Cited

U.S. PATENT DOCUMENTS

2004/0130019 A1* 7/2004 Chen ............................ 257/723

FOREIGN PATENT DOCUMENTS

| CN | 1711442 A | 12/2005 |
| CN | 201059474 Y | 5/2008 |
| CN | 102494297 A | 6/2012 |

* cited by examiner

*Primary Examiner* — Phu Vu
(74) *Attorney, Agent, or Firm* — Andrew C. Cheng (57) ABSTRACT

A light guiding system, an edge-type backlight module and a liquid crystal display are disclosed. The light guiding system includes an ambient light collection system facing toward ambient light for absorbing the ambient light, a plurality of light guiding devices, and a fluorescent film arranged between the light emitting ends and the light incident surface. Each of the plurality of light guiding devices includes a light emitting end and a light incident end. The light emitting ends are arranged close to a light incident surface of a light guiding plate, and the light incident ends are arranged close to the ambient light collection system. The absorbed ambient light enters the light incident ends and propagates toward the light emitting ends. By adopting the fluorescent film, the light beams from the light emitting ends are diffused such that brightness difference on the light incident surface is enhanced.

18 Claims, 6 Drawing Sheets

LIGHT GUIDING SYSTEM, EDGE-TYPE BACKLIGHT MODULE, AND LIQUID DISPLAY DEVICE

BACKGROUND OF THE INVENTION

1. Field of the Invention

Embodiments of the present disclosure relate to liquid crystal display technology, and more particularly to a light guiding system, an edge-type backlight module, and a liquid crystal display.

2. Discussion of the Related Art

Currently, original light sources are adopted as backlight sources in Liquid Crystal Displays (LCDs). The original light sources relate to light sources emitting lights by electrical power, such as LEDs. LEDs present many advantages including lower power consumption, and thus are broadly adopted as backlight sources. In order to reduce the impact toward environment, the power consumption of LEDs has to be further reduced. As such, the amount of adopted LEDs has to be decreased. Alternatively, an enhanced light source has to replace the typical ones.

Figure 1:
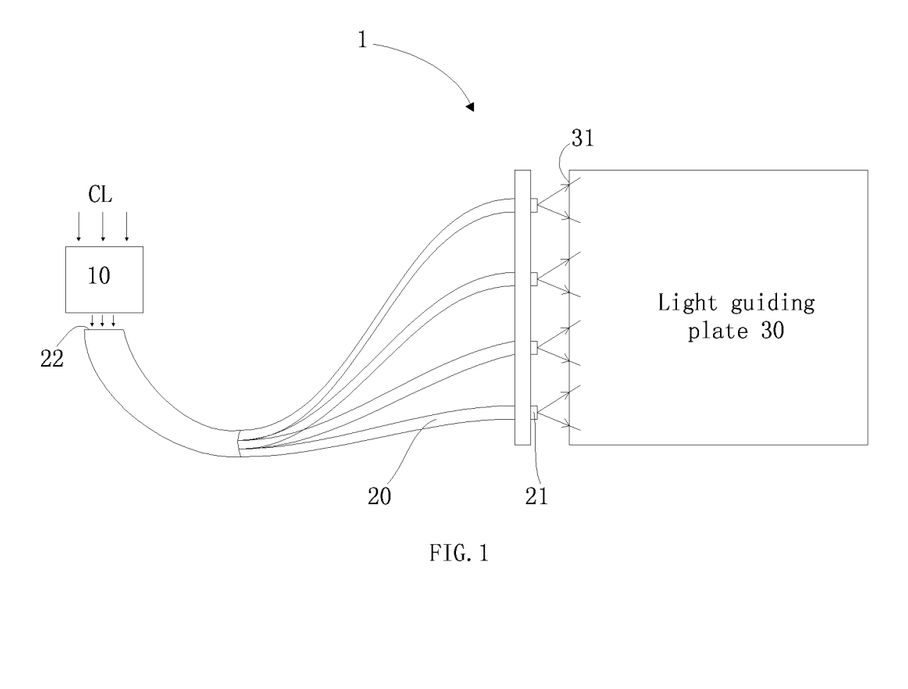
FIG. 1 is a schematic view of a conventional light guiding system.

For example, ambient light is a new type of energy efficient solution without consuming electrical power is needed. One feasible solution is to collect the ambient light with a plurality of optical fibers. The ambient light is then emitted to the backlight module by light emitting ends of the optical fibers. The number of the optical fibers may be configured so as to adjust the number of the backlight sources. Referring to FIG. 1, the light guiding system 1 includes an ambient light collection system 10, and a plurality of optical fibers 20. Each of the optical fibers includes a light incident end 21 and a light emitting end 22. The light emitting ends 22 of the optical fibers 20 are coupled together and are arranged close to the ambient light collection system 10. The light incident ends 21 of the optical fibers 20 are arranged close to a light incident surface 31 of a light guiding plate 30.

The ambient light CL collected by the ambient light collection system 10 enters the optical fibers 20 via the light emitting end 22, and is transmitted to the light incident end 21. The lights emitted from the light incident end 21 then enter the light guiding plate 30 by the light incident surface 31. However, as the light emitting angle of the light incident end 21 is usually less than 60 degrees, the brightness difference between the straight-ahead position and the two lateral sides is huge. The optical performance of the backlight module may be seriously affected when the brightness differences are easily detected. In addition, as there are lights with wavelength in a range between 200 nm and 400 nm, chemical reactions may occur when high-polymer materials are exposed to the short wavelength lights for a long period of time. As many components of the backlight module are made by high-polymer materials, it is doubtless that the functions of components may be affected.

SUMMARY

In one aspect, a light guiding system includes: an ambient light collection system facing toward ambient light for absorbing the ambient light; a plurality of light guiding devices, each of the light guiding devices includes a light emitting end and a light incident end, the light emitting ends are arranged close to a light incident surface of a light guiding plate, the light incident ends are arranged close to the ambient light collection system, and the absorbed ambient light enters the light incident ends and propagates toward the light emitting ends; and a fluorescent film arranged between the light emitting ends of the light guiding devices and the light incident surface of the light guiding plate.

Wherein the light guiding system further includes a plurality of masks for covering all of the light emitting ends of the light guiding devices, and the fluorescent film is arranged on internal walls of the masks.

Wherein the light guiding system further includes a mask for covering all of the light emitting ends of the light guiding devices, and the fluorescent film is arranged on an internal wall of the mask.

Wherein the fluorescent film is arranged on the light incident surface of the light guiding plate.

Wherein the fluorescent film is arranged on a light emitting surface of the light emitting end.

Wherein the fluorescent film is arranged on the light incident surface of the light guiding plate and on a light emitting surface of the light emitting end.

In another aspect, an edge-type backlight module includes: a back plate; a light guiding plate; an optical film; the light guiding plate includes a light incident surface, a bottom surface, and a top surface, the bottom surface and top surface are opposite to each other, the bottom surface and the top surface connect to the light incident surface, the back plate is arranged below the bottom surface, the optical film is arranged above the top surface. The edge-type backlight module includes a light guiding system includes: an ambient light collection system facing toward ambient light for absorbing the ambient light; a plurality of light guiding devices, each of the light guiding devices includes a light emitting end and a light incident end, the light emitting ends are arranged close to a light incident surface of a light guiding plate, the light incident ends are arranged close to the ambient light collection system, and the absorbed ambient light enters the light incident ends and propagates toward the light emitting ends; and a fluorescent film arranged between the light emitting ends of the light guiding devices and the light incident surface of the light guiding plate.

Wherein the light guiding system further includes a plurality of masks for covering all of the light emitting ends of the light guiding devices, and the fluorescent film is arranged on internal walls of the masks.

Wherein the light guiding system further includes a mask for covering all of the light emitting ends of the light guiding devices, and the fluorescent film is arranged on an internal wall of the mask.

Wherein the fluorescent film is arranged on the light incident surface of the light guiding plate.

Wherein the fluorescent film is arranged on a light emitting surface of the light emitting end.

Wherein the fluorescent film is arranged on the light incident surface of the light guiding plate and on a light emitting surface of the light emitting end.

In another aspect, a liquid crystal display includes: A display panel; a back plate; a light guiding plate; an optical film; the light guiding plate includes a light incident surface, a bottom surface, and a top surface, the bottom surface and top surface are opposite to each other, the bottom surface and the top surface connect to the light incident surface, the back plate is arranged below the bottom surface, the optical film is arranged above the top surface. The edge-type backlight module includes a light guiding system includes: an ambient light collection system facing toward ambient light for absorbing the ambient light; a plurality of light guiding devices, each of the light guiding devices includes a light emitting end and a light incident end, the light emitting ends are arranged close to a light incident surface of a light guiding plate, the light incident ends are arranged close to the ambient light collection system, and the absorbed ambient light enters the light incident ends and propagates toward the light emitting ends; and a fluorescent film arranged between the light emitting ends of the light guiding devices and the light incident surface of the light guiding plate.

Wherein the light guiding system further includes a plurality of masks for covering all of the light emitting ends of the light guiding devices, and the fluorescent film is arranged on internal walls of the masks.

Wherein the light guiding system further includes a mask for covering all of the light emitting ends of the light guiding devices, and the fluorescent film is arranged on an internal wall of the mask.

Wherein the fluorescent film is arranged on the light incident surface of the light guiding plate.

Wherein the fluorescent film is arranged on a light emitting surface of the light emitting end.

Wherein the fluorescent film is arranged on the light incident surface of the light guiding plate and on a light emitting surface of the light emitting end.

In view of the above, the fluorescent film is arranged between the light emitting ends of the optical fibers and the light incident surface of the light guiding plate. In this way, light beams from the light emitting ends are diffused such that the brightness difference on the light incident surface is enhanced. In addition, as the fluorescent film is capable of converting the short wavelength lights to visible lights so that the amount of the short wavelength lights entering into the backlight module is decreased. In addition, the amount of the visible lights entering into the backlight module is increased. In this way, service life of the components within the liquid crystal display is increased.

DETAILED DESCRIPTION OF THE EMBODIMENTS

Embodiments of the invention will now be described more fully hereinafter with reference to the accompanying drawings, in which embodiments of the invention are shown.

Figure 2:
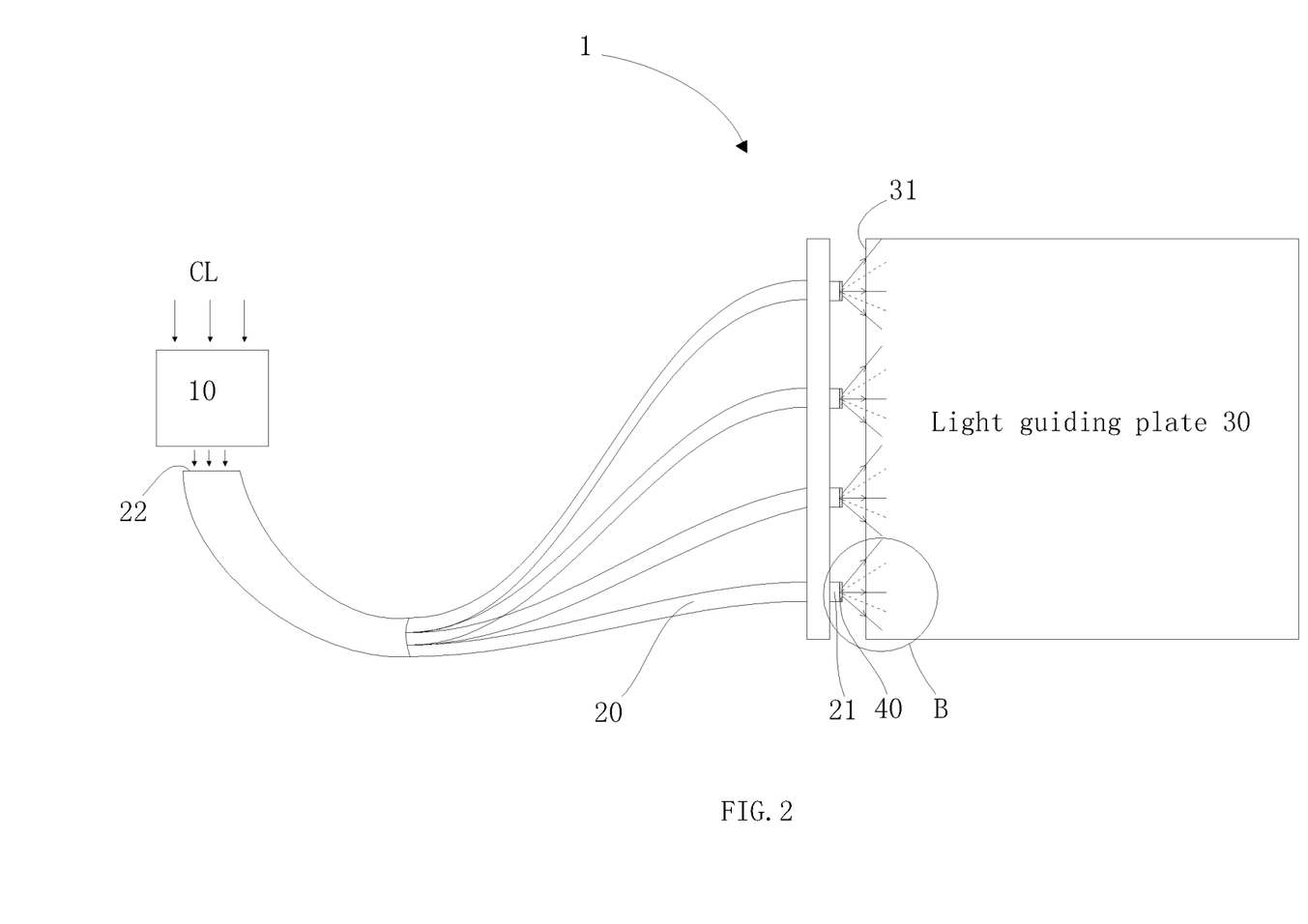
FIG. 2 is a schematic view of a light guiding system in accordance with a first embodiment.

FIG. 2 is a schematic view of a light guiding system in accordance with a first embodiment. The light guiding system 1 includes an ambient light collection system 10, a plurality of optical fibers 20, and a fluorescent film 40. The ambient light collection system 10 faces toward the ambient light CL and absorbs the ambient light CL. It is to be noted that the ambient light CL may be sun lights, lamp lights, or lights radiated by other lighting objects. Each of the optical fibers 20 includes a light emitting end 21 and a light incident end 22. The light incident ends 22 of the optical fibers 20 are coupled together and are arranged close to the ambient light collection system 10. The light emitting ends 21 of the optical fibers 20 are arranged close to a light incident surface 31 of a light guiding plate 30. It is to be understood that the arrangement and the number of the light emitting ends 21 may be configured according to real scenarios. That is to say, the configuration of the light emitting end 21 is not limited to the configuration shown in FIG. 2. In addition, a light emitting surface 211 of each of the light emitting end 21 is covered with the fluorescent film 40.

The absorbed ambient light CL enters the optical fibers 20 via the light incident end 22 and propagates toward the light emitting end 21. The lights emitted from the light emitting end 21 then enter the light incident surface 31 of the light guiding plate 30 via the fluorescent film 40. The optical fibers 20 are good light transmission devices so that the energy-loss during the transmission is quite low. As the absorbed lights include visible lights and lights with wavelength between 200 nm and 400 nm, the fluorescent film 40 is capable of converting the short wavelength lights to visible lights. In this way, the amount of the short wavelength lights is decreased, and the amount of visible lights is increased.

In the embodiment, the fluorescent film 40 is made by a tri-phosphor fluorescent powder mixed in an adequate ratio. The tri-phosphor may be, but not limited to, an Eu-activated red phosphor $Y_2O_3$:Eu, a green phosphor Ce, a Te-activated $MgAl_{11}O_{19}$:Ce,Tb, and an Eu-activated blue phosphor $BaMg_2Al_{16}O_{27}$:Eu.

Figure 3:
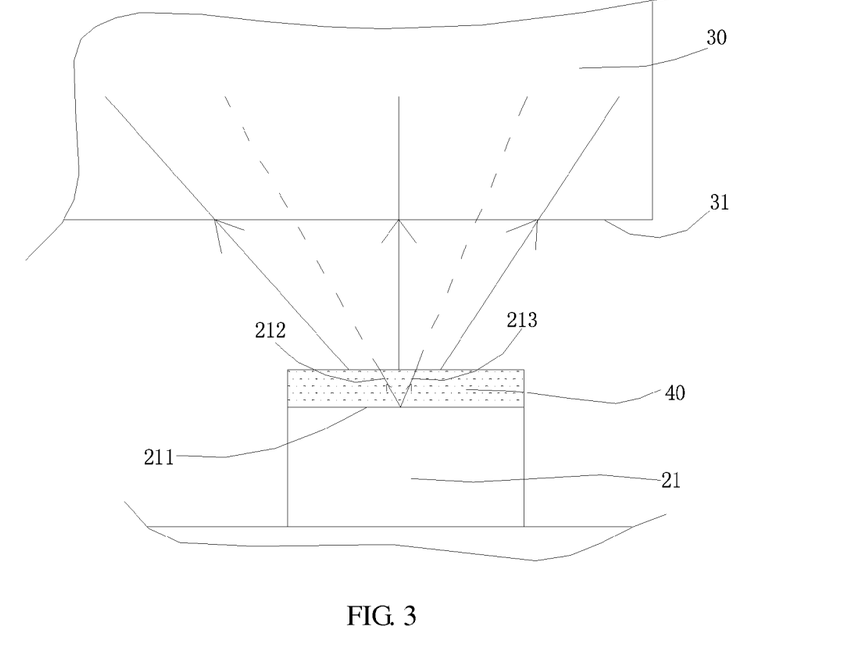
FIG. 3 is an enlarged view of the area "B" of FIG. 1.

As shown in FIG. 3, the fluorescent film 40 includes a plurality of diffusion particles. The diffusion particles are capable of diffusing the light beams emitted from the light emitting surface 211. Any two of the light beams 212, 213 may have the optical paths as shown by the dashed lines while the fluorescent film 40 is arranged on the light emitting surface 211 of the light emitting end 21. In the embodiment, the diffusion particles contained in the fluorescent film 40 diffuse the light beams passing through the fluorescent film 40. As such, the light beams 212, 213 have the optical paths as shown by the solid lines, and the light beams are diffused.

Figure 4:
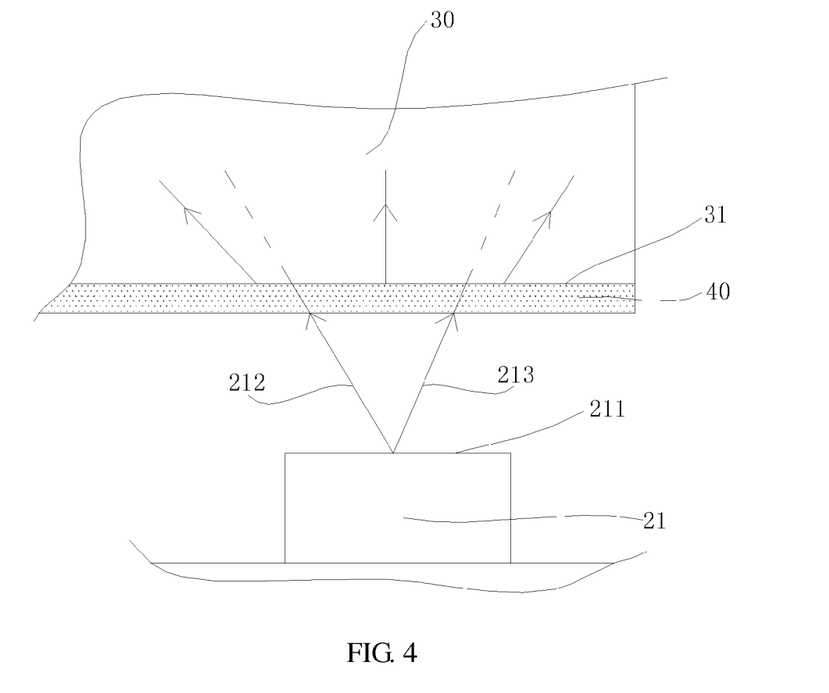
FIG. 4 is a schematic view of a fluorescent film in accordance with a second embodiment.

FIG. 4 is a schematic view of the fluorescent film in accordance with a second embodiment. The fluorescent film 40 is arranged on the light incident surface 31 of the light guiding plate 30. The light beams 212, 213 have the optical paths as shown by the solid lines due to the diffusion particles in the fluorescent film 40. In this way, the lights emitted by the light emitting surface 211 are diffused.

Figure 5A:
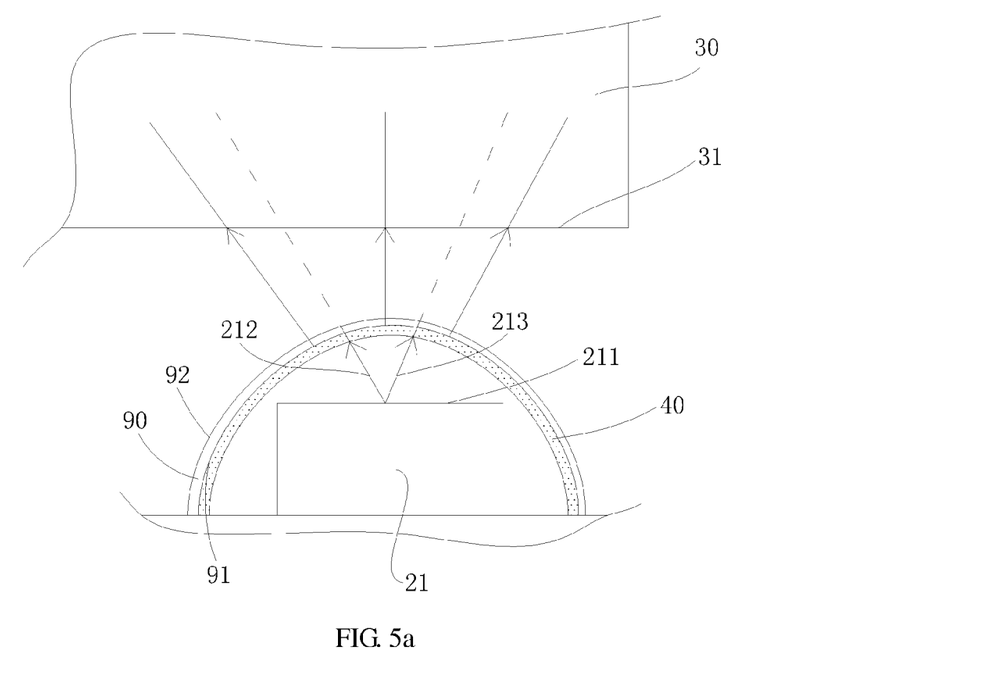
FIGS. 5a and 5b are schematic views of the fluorescent film in accordance with a third embodiment.
Figure 5B:
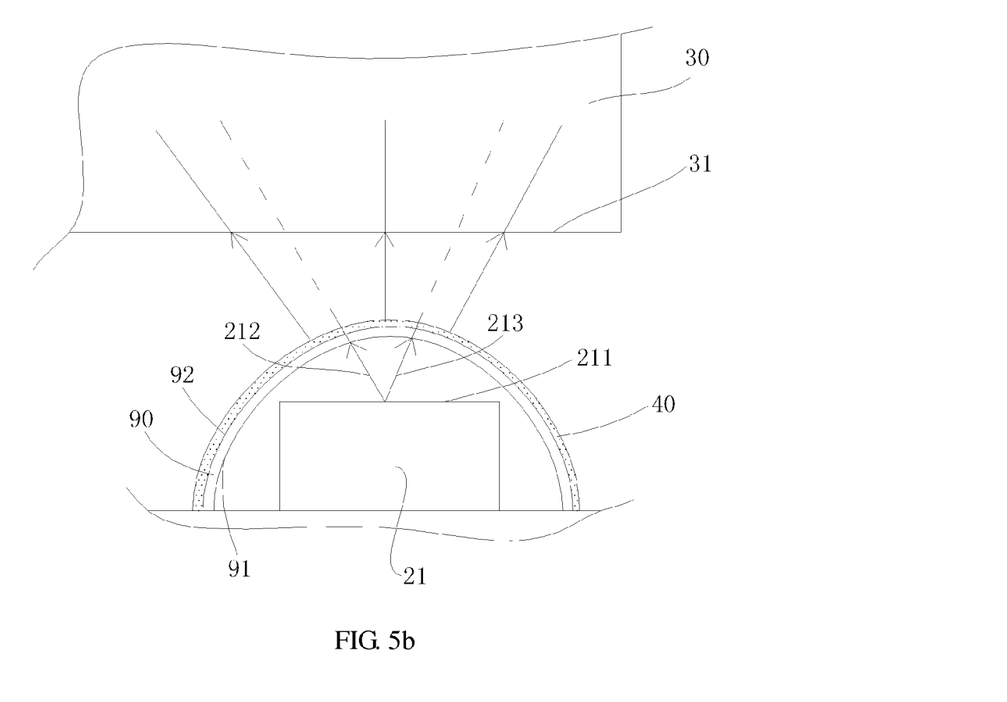

FIGS. 5a and 5b are schematic views of the fluorescent film in accordance with a third embodiment. The fluorescent film 40 may be arranged on other positions. In one embodiment, a mask 90 is arranged in accordance to each of the light emitting ends 21. The mask 90 includes an internal wall 91 facing toward the light emitting end 21 and an outer surface 92 facing away the light emitting end 21. The fluorescent film 40 may be arranged on the internal wall 91 or the outer surface 92. The light beams 212, 213 have the optical paths as shown by the solid lines due to the diffusion particles in the fluorescent film 40. As such, the lights emitted from the light emitting surface 211 are diffused. It is to be noted that the shape of the mask 90 may be, but not limited to, substantially circle. The shape of the mask 90 may be rectangular or oval.

Figure 6A:
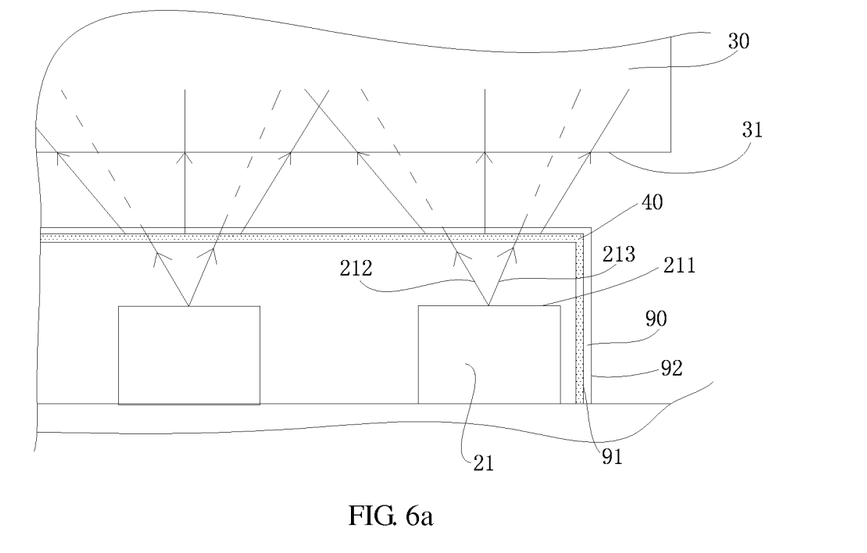
FIGS. 6a and 6b are schematic views of the fluorescent film in accordance with a fourth embodiment.
Figure 6B:
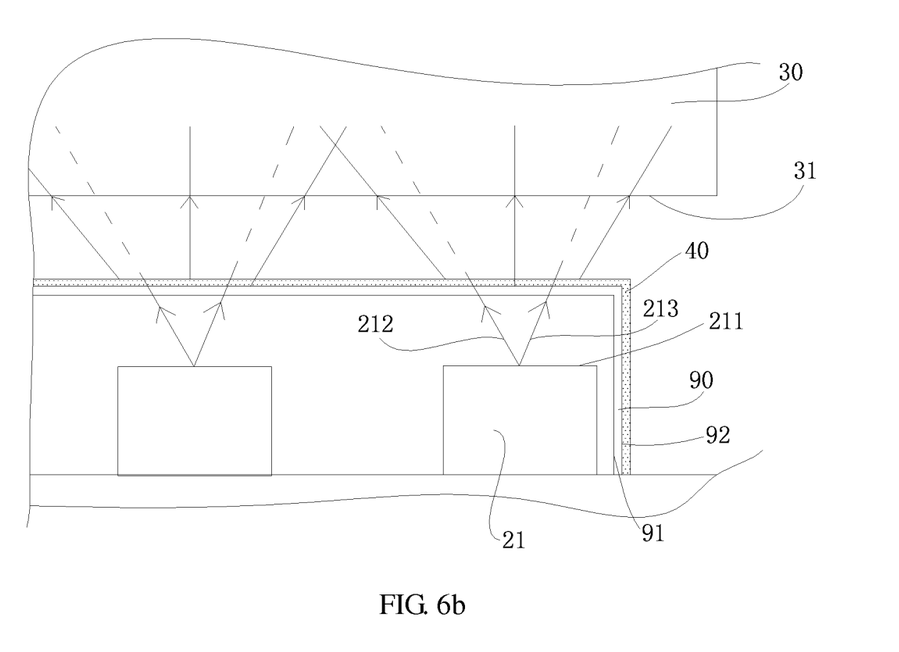

FIGS. 6a and 6b are schematic views of the fluorescent film in accordance with a fourth embodiment. In the embodiment, one mask 90 is configured to cover all of the light emitting ends 21 of the plurality of optical fibers 20. The fluorescent film 40 may be arranged on the internal wall 91 or the outer surface 92. The light beams 212, 213 have the optical paths as shown by the solid lines due to the diffusion particles in the fluorescent film 40. As such, the lights emitted from the light emitting surface 211 are diffused. It is to be noted that the shape of the mask 90 may be, but not limited to, substantially circle. The shape of the mask 90 may be rectangular or oval.

Figure 7:
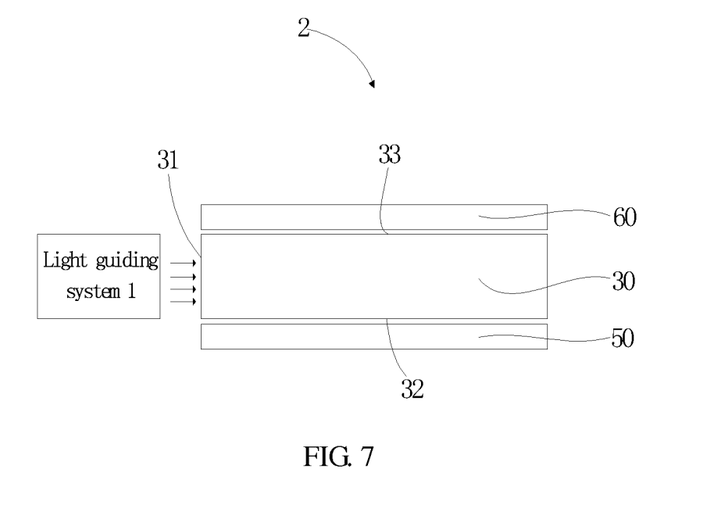
FIG. 7 is a schematic view of the edge-type backlight module in accordance with one embodiment.

FIG. 7 is a schematic view of the edge-type backlight module in accordance with one embodiment. The edge-type backlight module 2 includes a back plate 50, a light guiding plate 30, an optical film 60, and the light guiding system. The light guiding plate 30 includes a light incident surface 31, a bottom surface 32, and a top surface 33. The bottom surface 32 and the top surface 33 are opposite to each other, and connect to the light incident surface 31. The back plate 50 is arranged below the bottom surface 32. The optical film 60 is arranged above the top surface 33. In the embodiment, the lights emitted from the light guiding system enter the light guiding plate 30 via the light incident surface 31. The lights are then uniformly mixed within the light guiding plate 30 and emit out from the top surface 33.

Figure 8:
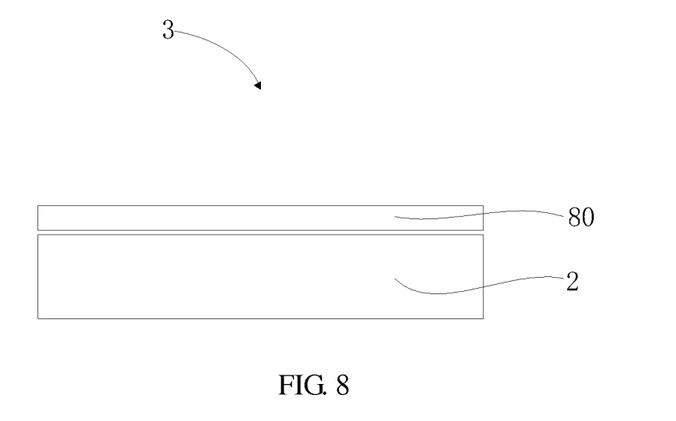
FIG. 8 is a schematic view of the liquid crystal display in accordance with one embodiment.

FIG. 8 is a schematic view of the liquid crystal display in accordance with one embodiment. Referring to FIG. 8, a display panel 80 is arranged above the edge-type backlight module 2 so as to form a liquid crystal display 3. The edge-type backlight module 2 provides the lights to the display panel 80 such that the display panel 80 is capable of displaying images.

In view of the above, the fluorescent film is arranged between the light emitting ends of the optical fibers and the light incident surface of the light guiding plate. In this way, the light beams from the light emitting ends are diffused such that the brightness difference on the light incident surface is enhanced. In addition, as the fluorescent film is capable of converting the short wavelength lights to visible lights so that the amount of the short wavelength lights entering into the backlight module is decreased. In addition, the amount of the visible lights entering into the backlight module is increased. In this way, the service life of the components within the liquid crystal display is increased.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A light guiding system, comprising:
    an ambient light collection system facing toward ambient light for absorbing the ambient light;
    a plurality of light guiding devices, each of the light guiding devices comprises a light emitting end and a light incident end, the light emitting ends are arranged close to a light incident surface of a light guiding plate, the light incident ends are coupled together and are arranged close to the ambient light collection system, and the absorbed ambient light enters the light incident ends and propagates toward the light emitting ends; and
    a fluorescent film arranged between the light emitting ends of the light guiding devices and the light incident surface of the light guiding plate.

2. The light guiding system as claimed in claim 1, wherein the light guiding system further comprises a plurality of masks for covering all of the light emitting ends of the light guiding devices, and the fluorescent film is arranged on internal walls of the masks.

3. The light guiding system as claimed in claim 1, wherein the light guiding system further comprises a mask for covering all of the light emitting ends of the light guiding devices, and the fluorescent film is arranged on an internal wall of the mask.

4. The light guiding system as claimed in claim 1, wherein the fluorescent film is arranged on the light incident surface of the light guiding plate.

5. The light guiding system as claimed in claim 1, wherein the fluorescent film is arranged on a light emitting surface of the light emitting end.

6. The light guiding system as claimed in claim 1, wherein the fluorescent film is arranged on the light incident surface of the light guiding plate and on a light emitting surface of the light emitting end.

7. An edge-type backlight module, comprising:
    a back plate;
    a light guiding plate;
    an optical film;
    the light guiding plate comprises a light incident surface, a bottom surface, and a top surface, the bottom surface and top surface are opposite to each other, the bottom surface and the top surface connect to the light incident surface, the back plate is arranged below the bottom surface, the optical film is arranged above the top surface, the edge-type backlight module comprises a light guiding system comprises:
    an ambient light collection system facing toward ambient light for absorbing the ambient light;
    a plurality of light guiding devices, each of the light guiding devices comprises a light emitting end and a light incident end, the light emitting ends are coupled together and are arranged close to a light incident surface of a light guiding plate, the light incident ends are arranged close to the ambient light collection system, and the absorbed ambient light enters the light incident ends and propagates toward the light emitting ends; and
    a fluorescent film arranged between the light emitting ends of the light guiding devices and the light incident surface of the light guiding plate.

8. The edge-type backlight module in claim 7, wherein the light guiding system further comprises a plurality of masks for covering all of the light emitting ends of the light guiding devices, and the fluorescent film is arranged on internal walls of the masks.

9. The edge-type backlight module in claim 7, wherein the light guiding system further comprises a mask for covering all of the light emitting ends of the light guiding devices, and the fluorescent film is arranged on an internal wall of the mask.

10. The edge-type backlight module in claim 7, wherein the fluorescent film is arranged on the light incident surface of the light guiding plate.

11. The edge-type backlight module in claim 7, wherein the fluorescent film is arranged on a light emitting surface of the light emitting end.

12. The edge-type backlight module in claim 7, wherein the fluorescent film is arranged on the light incident surface of the light guiding plate and on a light emitting surface of the light emitting end.

13. A liquid crystal display, comprising:
    a display panel;
    a back plate;
    a light guiding plate;
    an optical film;
    the light guiding plate comprises a light incident surface, a bottom surface, and a top surface, the bottom surface and top surface are opposite to each other, the bottom surface and the top surface connect to the light incident surface, the back plate is arranged below the bottom surface, the optical film is arranged above the top surface, the edge-type backlight module comprises a light guiding system comprises:

an ambient light collection system facing toward ambient light for absorbing the ambient light;

a plurality of light guiding devices, each of the light guiding devices comprises a light emitting end and a light incident end, the light emitting ends are coupled together and are arranged close to a light incident surface of a light guiding plate, the light incident ends are arranged close to the ambient light collection system, and the absorbed ambient light enters the light incident ends and propagates toward the light emitting ends; and a fluorescent film arranged between the light emitting ends of the light guiding devices and the light incident surface of the light guiding plate.

14. The liquid crystal display in claim 13, wherein the light guiding system further comprises a plurality of masks for covering all of the light emitting ends of the light guiding devices, and the fluorescent film is arranged on internal walls of the masks.

15. The liquid crystal display in claim 13, wherein the light guiding system further comprises a mask for covering all of the light emitting ends of the light guiding devices, and the fluorescent film is arranged on an internal wall of the mask.

16. The liquid crystal display in claim 13, wherein the fluorescent film is arranged on the light incident surface of the light guiding plate.

17. The liquid crystal display in claim 13, wherein the fluorescent film is arranged on a light emitting surface of the light emitting end.

18. The liquid crystal display in claim 13, wherein the fluorescent film is arranged on the light incident surface of the light guiding plate and on a light emitting surface of the light emitting end.

* * * * *